(12) United States Patent
Cespedosa Castán et al.

(10) Patent No.: US 12,466,583 B2
(45) Date of Patent: Nov. 11, 2025

(54) RETAINING AND RELEASING DEVICE AND ASSEMBLY FOR SPACECRAFT

(71) Applicant: AIRBUS DEFENCE AND SPACE S.A., Madrid (ES)

(72) Inventors: Fernando José Cespedosa Castán, Madrid (ES); José Luis Mora Plaza, Madrid (ES)

(73) Assignee: Airbus Defence and Space S.A., Madrid (ES)

( * ) Notice: Subject to any disclaimer, the term of this patent is extended or adjusted under 35 U.S.C. 154(b) by 63 days.

(21) Appl. No.: 18/547,501

(22) PCT Filed: Feb. 25, 2021

(86) PCT No.: PCT/ES2021/070137
§ 371 (c)(1),
(2) Date: Aug. 22, 2023

(87) PCT Pub. No.: WO2022/180281
PCT Pub. Date: Sep. 1, 2022

(65) Prior Publication Data
US 2024/0132234 A1   Apr. 25, 2024
US 2024/0228069 A9   Jul. 11, 2024

(51) Int. Cl.
*B64G 1/64* (2006.01)
*B64G 1/22* (2006.01)

(52) U.S. Cl.
CPC .......... *B64G 1/641* (2013.01); *B64G 1/6457* (2023.08); *B64G 1/2228* (2023.08)

(58) Field of Classification Search
CPC ...... B60K 2015/056; B60K 2015/0576; B60K 2015/0584; B60K 15/05; E05B 15/022;
(Continued)

(56) References Cited

U.S. PATENT DOCUMENTS

| | | | |
|---|---|---|---|
| 5,312,152 A | 5/1994 | Woebkenberg, Jr. et al. | |
| 5,702,069 A | 12/1997 | Geyer et al. | |
| 8,568,053 B2 * | 10/2013 | Baghdasarian | B64G 1/645 403/2 |

FOREIGN PATENT DOCUMENTS

| | | |
|---|---|---|
| EP | 2298648 A1 | 3/2011 |
| KR | 20120009568 A | 2/2012 |

(Continued)

OTHER PUBLICATIONS

International Search Report and Written Opinion for PCT/ES2021/070137 (Nov. 16, 2021).

*Primary Examiner* — Christine M Mills
*Assistant Examiner* — Yahya Sidky
(74) *Attorney, Agent, or Firm* — Merchant & Gould, P.C.

(57) ABSTRACT

A retaining and releasing device for spaceships retains and releases a body to/from a support structure. A releasing bolt keeps the releasable body and the support structure connected in a position for locking the retaining and releasing device. A locking device for locking the releasing bolt in the support structure has a case and a segmented ring. The case is movable axially relative to the releasing bolt and includes an end with a through-slot. A releasing system includes an actuator, a rod having the same orientation as the releasing bolt, with a locking pin, cooperating with the slot, and a compression spring. The actuator locks the rod in a position for locking the retaining and releasing device. The compression spring is in contact with the case of the locking device and disposed around the rod to rotate the rod. The device includes a system for removing the releasing bolt.

8 Claims, 9 Drawing Sheets

(58) Field of Classification Search
CPC ....... E05B 2015/023; E05B 2015/0235; E05B 83/24; E05B 83/243; E05B 83/247; E05B 83/34; E05B 47/0002; E05B 47/0005; E05B 47/0009; E05B 17/0025; E05B 17/0029; E05B 17/0033; E05B 17/0037; E05B 63/12; E05B 63/122; E05B 63/123; E05B 63/125; E05B 63/126; E05B 63/127; E05B 63/128; E05B 63/14; E05B 63/143; E05B 2063/0026; E05B 47/0046; E05B 47/06; E05B 47/0603; E05B 47/0607; E05B 47/0696; E05B 2047/0024; E05B 2047/0025; E05B 2047/0037; B64G 1/2228; B64G 1/6457; B64G 1/222; B64G 1/645; B64G 1/641; Y10T 292/696; Y10T 292/699; Y10T 403/60; Y10T 403/602; Y10T 403/604
See application file for complete search history.

(56) References Cited

FOREIGN PATENT DOCUMENTS

| | | | |
|---|---|---|---|
| RU | 2669246 C1 | 10/2018 | |
| WO | 87/04372 A1 | 7/1987 | |
| WO | 2007/007109 A1 | 1/2007 | |
| WO | WO-2020249831 A1 * | 12/2020 | ........... B64G 1/2228 |
| WO | WO-2024018092 A1 * | 1/2024 | |

* cited by examiner

RETAINING AND RELEASING DEVICE AND ASSEMBLY FOR SPACECRAFT

This application is a National Stage Application of PCT/ES2021/070137, filed Feb. 25, 2021, which application is incorporated herein by reference. To the extent appropriate, a claim of priority is made to the above disclosed application.

FIELD OF THE INVENTION

The invention refers to a device for providing retaining and structural continuity between two elements, such as a spacecraft and a launcher (or a dispenser interface). The device is also suitable for retaining and releasing other deployable elements, such as antennae, solar panels, etc. The invention also refers to an assembly comprising said retaining and releasing device.

BACKGROUND OF THE INVENTION

Currently there are restraint and release devices especially adapted for use on space support structures, known as retaining and releasing systems or mechanisms, which are suitable for the restraint and release of separable and/or deployable bodies from a space support structure.

EP 2298648 A1, referred to a "restraint and release device", describes a device for the restraint and release of a deployable body mounted on a support structure, the device being operable between a stowed condition and a released condition, and comprising a pair of subassemblies, each for being attached to either the deployable body or the support structure, these subassemblies comprising mating surfaces which interlock with one another in the stowed condition to substantially prevent lateral movement of the deployable body relative to the support structure; a releasable tensioned element which is connected to both of the subassemblies, exerting a compressive pre-load action on the said subassemblies that keep them together; a force measurement system that allows monitoring the cited compressive pre-load action applied; a releasing device for releasing the cited pre-load, allowing the free separation of the subassemblies; and a pre-load application mechanism embedded in the device such that it applies a substantially pure-tension pre-load to the releasable tensioned element.

WO 2007007109 A1 discloses an electro-magnetic release mechanism that comprises a spring-operated rod having a recess and a latching member engageable in the recess to block motion of the rod. A release member retains the latching member engaged in the recess in a first position of the release member and allows the latching member to be disengaged from the recess in a second position of the release member. A magnet retains the release member in the first position and the mechanism includes means such as a spring for urging the release member to the second position. A coil is arranged to demagnetise the magnet at least such that the release member moves to the second position, the latching member is disengaged from the recess and the rod moves axially by spring force.

These devices satisfactorily perform the release function. However, there is a need to provide a retaining and releasing device for spacecraft with a simple construction that allows an easy reset without refurbishment after activation.

SUMMARY OF THE INVENTION

The object of the invention is to provide a retaining and releasing device for spacecraft that overcomes the mentioned drawbacks.

The invention provides a retaining and releasing device for spacecraft, configured for the retaining and releasing of a releasable body with respect to a support structure, that comprises:
- a release bolt configured to keep the releasable body and the support structure together in a locked position of the retaining and releasing device,
- a locking device for locking the release bolt in the support structure, the locking device comprising a housing and a segmented ring, the housing being movable in the direction of the axis of the release bolt and the segmented ring configured to expand radially, the external surface of the segmented ring and the internal surface of a corresponding part of the housing being mating surfaces inclined with respect to the axis of the release bolt, such that in the locked position of the retaining and releasing device the release bolt is configured to be retained by the segmented ring,
- an extraction system for the release bolt, comprising a spring, an upper support, a lower support and a nut between the upper support and the lower support, the spring being guided by the upper support and the lower support, wherein
the housing of the locking device comprises an end with a passing groove on its surface, and the retaining and releasing device additionally comprises:
- a release system for acting on the locking device, comprising:
  - a rod with a locking pin, the rod having the same orientation as the release bolt, and the locking pin configured to cooperate with the groove of the housing,
  - a compression spring, and
  - an actuator such that the actuator is configured to lock the rod in a locked position of the retaining and releasing device, and the compression spring is arranged to abut the housing of the locking device and is also arranged around the rod to make the rod turn.

The invention also provides a retaining and releasing assembly for spacecraft that comprises a central actuator on the support structure surrounded by several retaining and releasing devices having a part on the releasable body and a part on the support structure and connected to the central actuator.

The main advantages of the invention with respect to the prior art devices are the following ones:
- It is a non-explosive release.
- It allows a low shock.
- It requires a low voltage activation.
- It is able of being reset by the user, after activation.
- No refurbishment is needed before re-arm.
- Multiple simultaneous releases can be synchronized.

Another advantage of the invention is that it has a preloaded bolted joint and is able to release it.

Other characteristics and advantages of the present invention will be clear from the following detailed description of several embodiments illustrative of its object in relation to the attached figures.

DETAILED DESCRIPTION OF THE INVENTION

Figure 1:
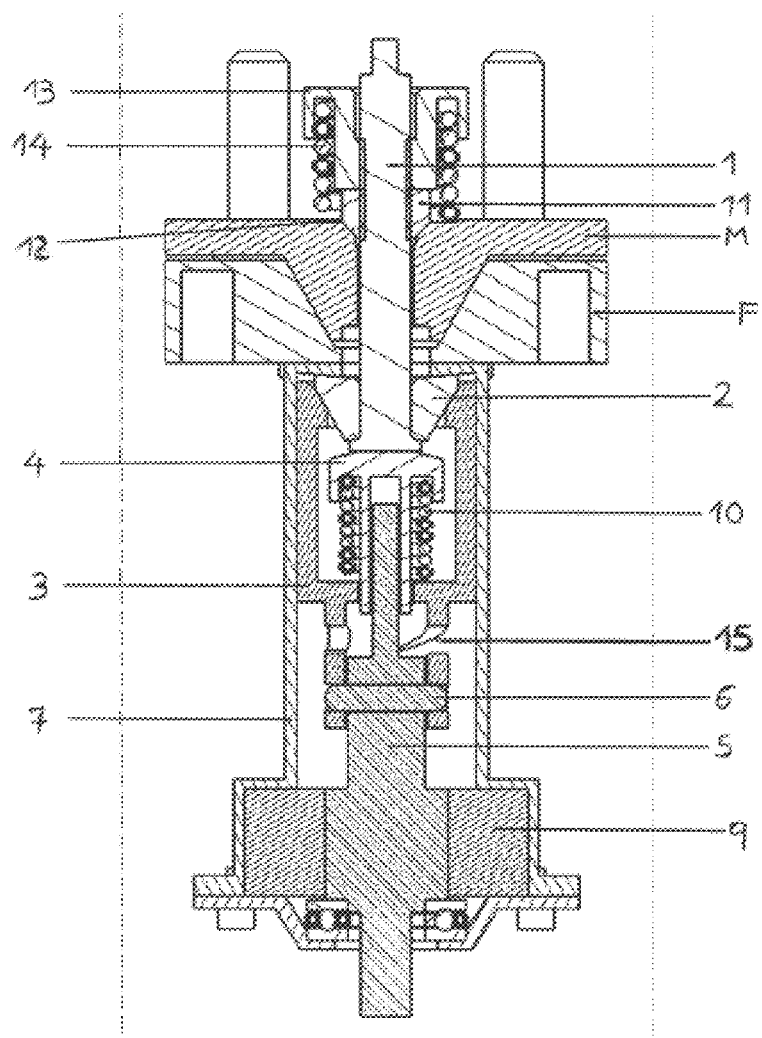
FIG. 1 shows a section view of the retaining and releasing device for spacecraft in a locked position.
Figure 2:
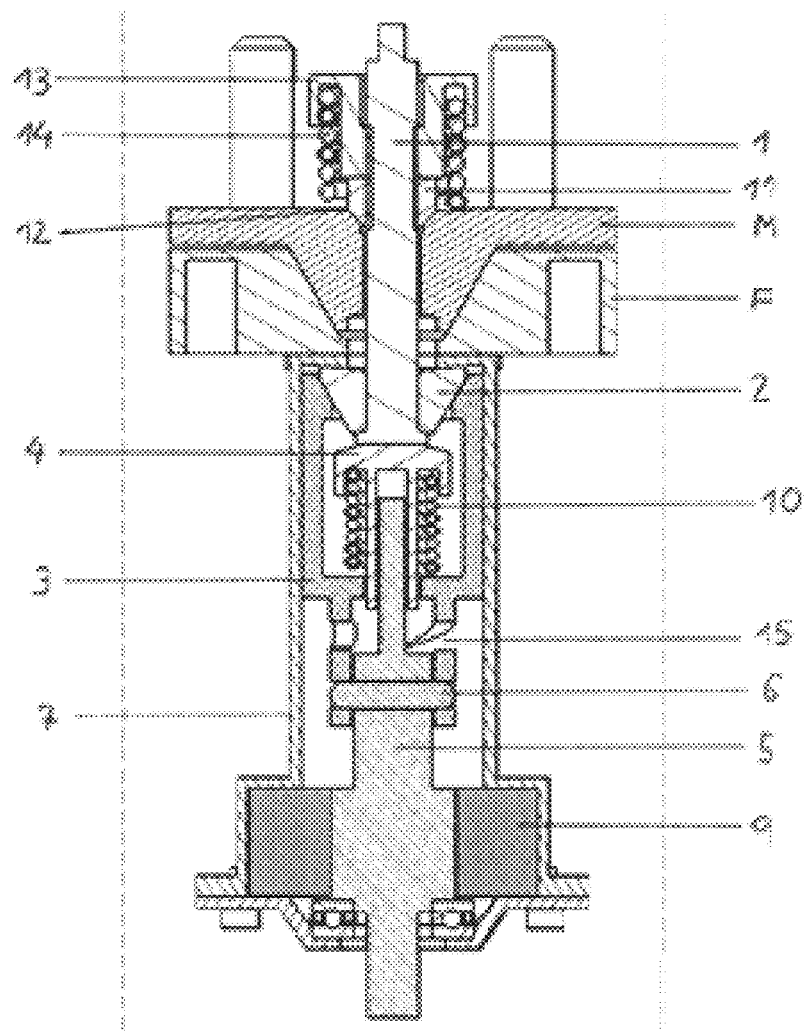
FIGS. 2 to 7 shows a section view of the retaining and releasing device for spacecraft in different stages during the release process.
Figure 3:
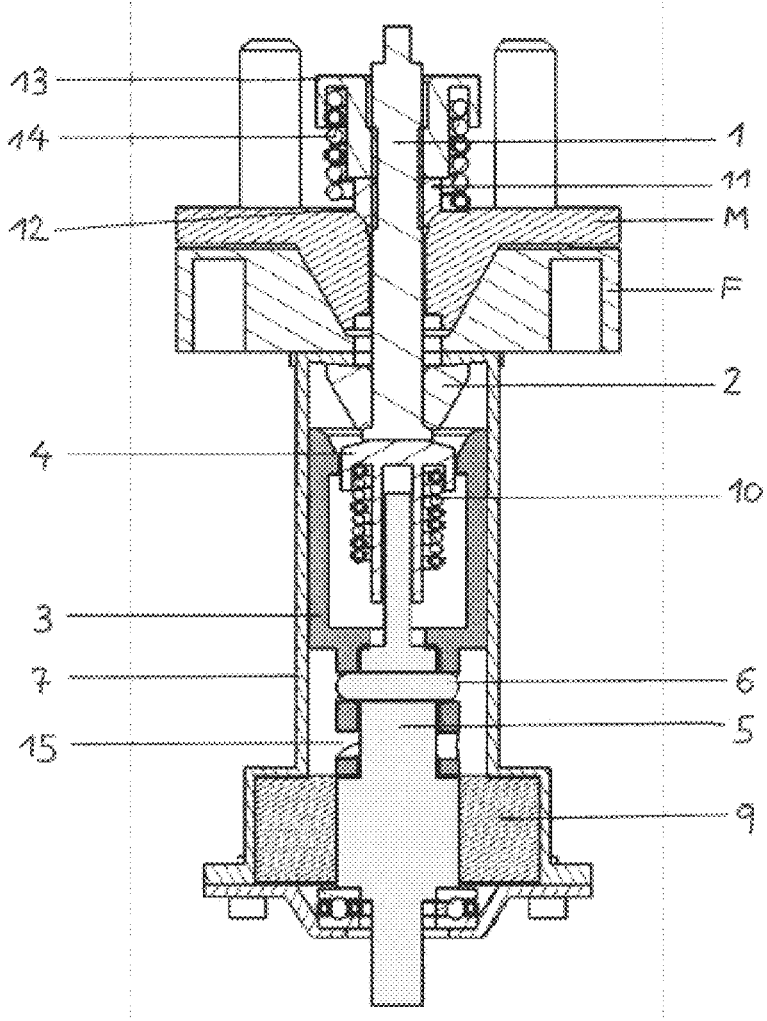
Figure 4:
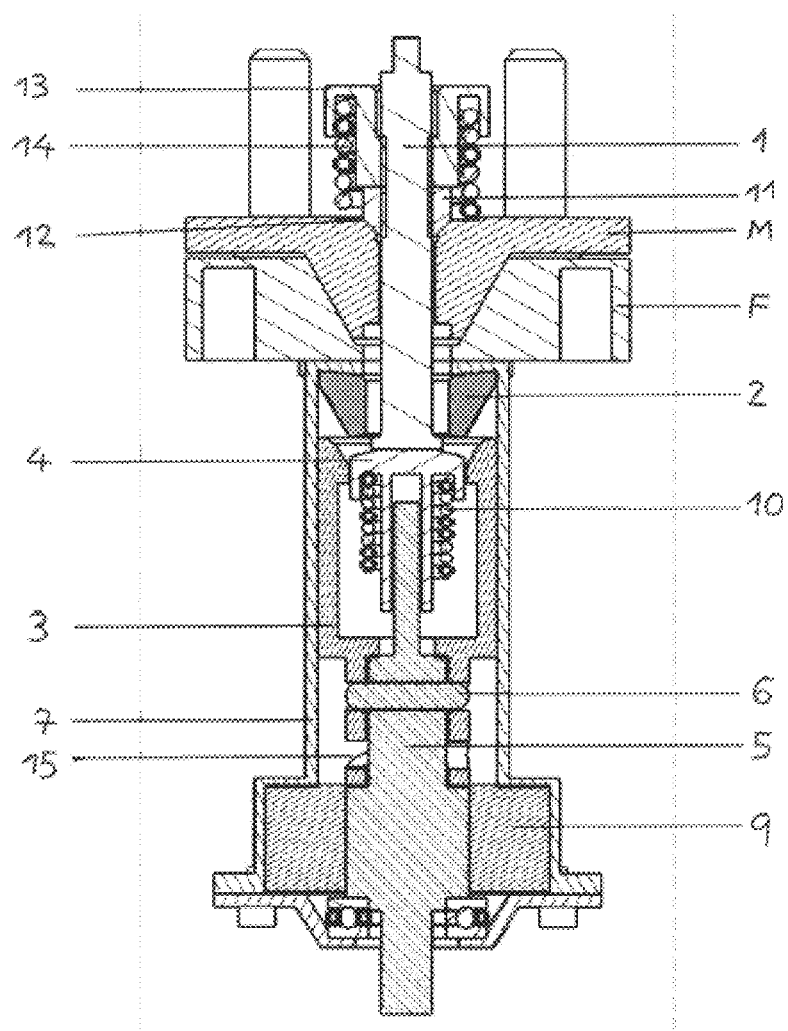
Figure 5:
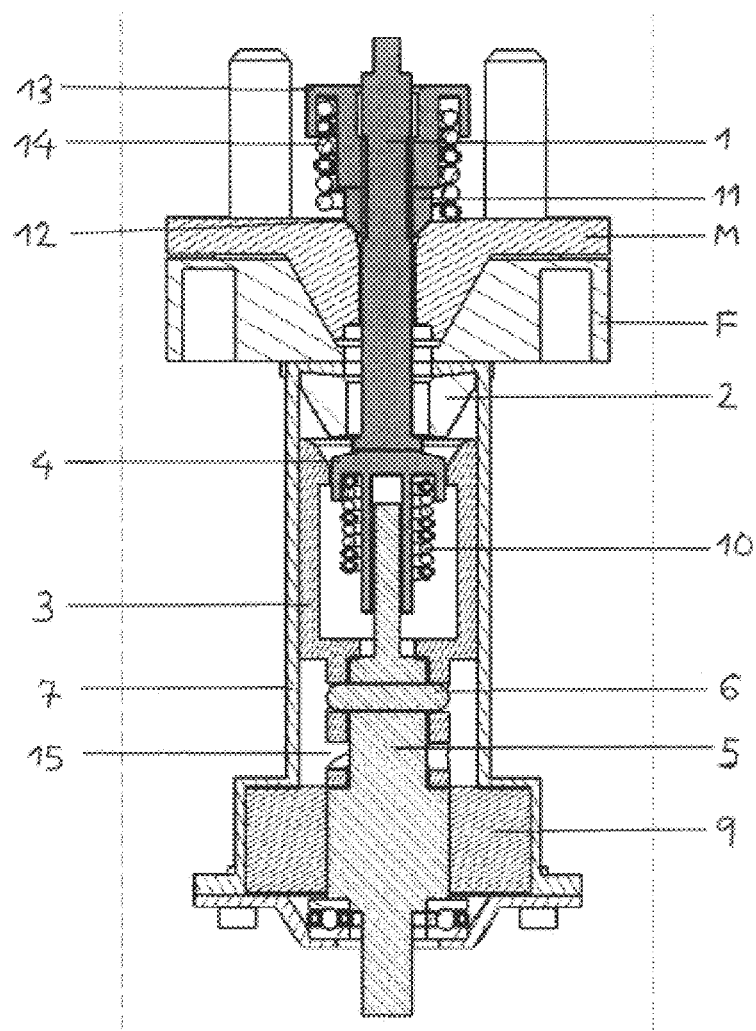
Figure 6:
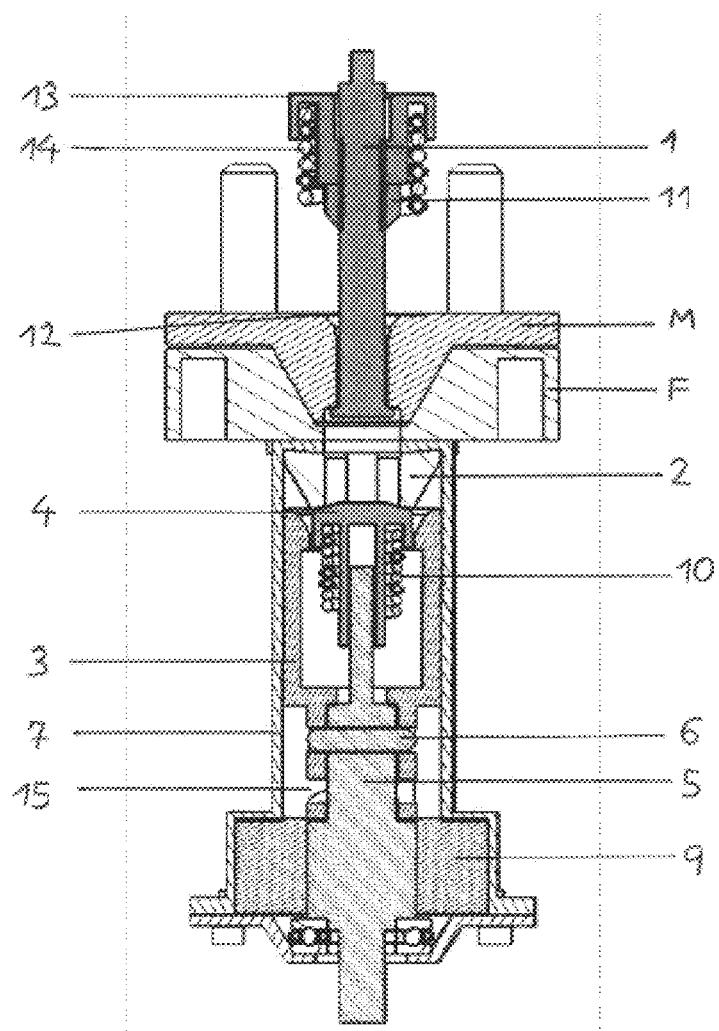

FIGS. 1 and 2 show a retaining and releasing device for spacecraft for the retaining and releasing of a releasable body M (mobile) with respect to a support structure F (fixed), that comprises:
- a release bolt 1 configured to keep the releasable body M and the support structure F together in a locked position of the retaining and releasing device,
- a locking device for locking the release bolt 1 in the support structure F, the locking device comprising a housing 3 and a segmented ring 2, the housing 3 being movable in the direction of the axis of the release bolt 1 and comprising an end with a passing groove 15 on its surface, and the segmented ring 2 configured to expand radially, the external surface of the segmented ring 2 and the internal surface of a part of the housing 3 being mating surfaces inclined with respect to the axis of the release bolt 1, such that in the locked position of the retaining and releasing device the release bolt 1 is configured to be retained by the segmented ring 2,
- a release system for acting on the locking device, comprising:
  - an actuator 9,
  - a rod 5 with a locking pin 6, the rod 5 having the same orientation as the release bolt 1, and the locking pin 6 configured to cooperate with the groove 15 of the housing 3, and
  - a compression spring 10,
such that the actuator 9 is configured to lock the rod 5 in a locked position of the retaining and releasing device, and the compression spring 10 is arranged to abut the housing 3 of the locking device and is also arranged around the rod 5 to make the rod 5 turn, and
- an extraction system for the release bolt 1, comprising a spring 14, an upper support 13, a lower support 12 and a nut 11 between the upper support 13 and the lower support 12, the spring 14 being guided by the upper support 13 and the lower support 12.

FIG. 1 shows a cross section view of a retaining and releasing device for spacecraft of the invention in a locked position, in which a releasable body M is attached to a support structure F.

Figure 8:
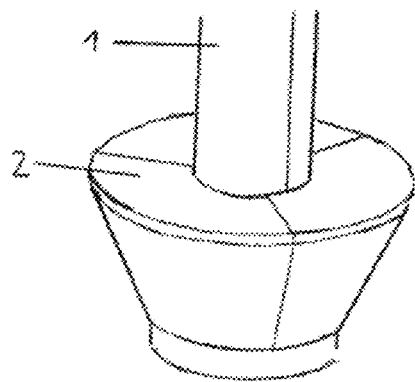
FIG. 8 shows a detailed view of the segmented ring of the retaining and releasing device in the position of FIG. 1.

The locking device comprises a housing 3 and a segmented ring 2, and in the locked position of FIG. 1 the segmented ring 2 remains closed due to the action of the housing 3. The external surface of the segmented ring 2 and the internal surface of the housing 3 are mating surfaces inclined with respect to the axis of the release bolt 1. In the position of FIG. 1, the segmented ring 2 retains the release bolt 1 (in this FIG. 1, the base of the release bolt 1 is retained by the segmented ring 2; FIG. 8 shows a detail of the segmented ring 2 retaining the base of the release bolt 1 in the locked position).

The retaining and releasing device can also comprise an external housing 7 that supports the actuator 9 and surrounds the housing 3.

The actuator can be a magnetic brake, but it can also be of another type.

The release bolt 1 is preloaded by the action of the compression spring 14 and the nut 11.

In the position of FIG. 1 the actuator 9 locks the rod 5, and the compression spring 10 is in a compressed state.

Figure 7:
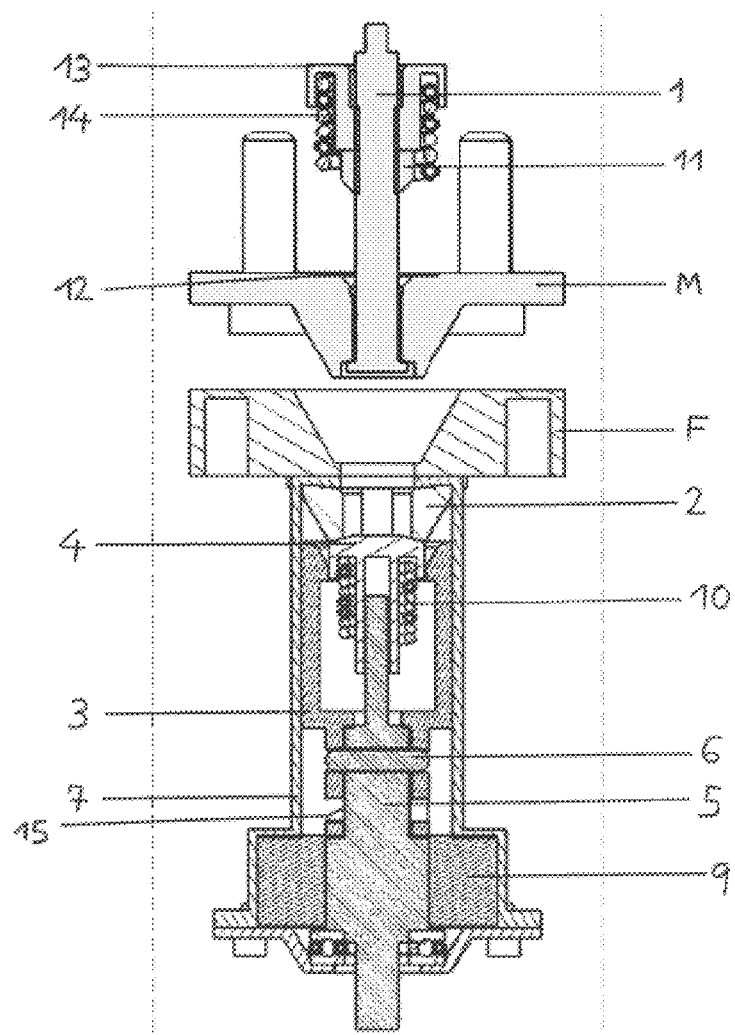

FIG. 7 corresponds to a cross section view of a retaining and releasing device for spacecraft of the invention in a release position, in which the releasable body M is released from the support structure F.

After an electrical command is sent to the actuator 9, the rod 5 is released, so it is free to rotate by means of the compression spring 10 that also makes the rod 5 turn. The rod 5 rotates a quarter turn, with the locking pin 6 moving in the groove 15 and guided by it, and the compression spring 10 expands, so it forces the housing 3 to move down in the direction of the axis of the release bolt 1 to free the segmented ring 2, the segmented ring 2 then expands radially and changes into its open position (see also FIG. 9), the support 4 keeps the segmented ring 2 opens thanks to the compression spring 10. With the segmented ring 2 in its open position the release bolt 1 is freed, loses the preload and is ejected outwards by the action of the spring 14 guided by the upper support 13 and the lower support 12, the spring 14 pushing the upper support 13, to allow the separation of the releasable body M and the support structure F.

The retaining and releasing device can be reset following the same steps backwards, to its initial position for a new operation without refurbishment.

The locking device and the release system can be arranged in the support structure F.

The actuator 9 can be a permanent magnetic brake surrounding the rod 5.

The mating surfaces of the segmented ring 2 and the housing 3 can be tapered surfaces.

One of the ends of the compression spring 10 can rest on a surface of a support 4 opposite the surface of the housing 3 that the compression spring 8 is arranged to abut.

Figure 9:
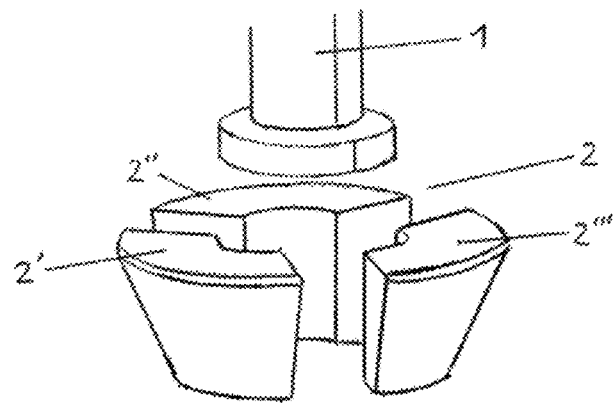
FIG. 9 shows a detailed view of the segmented ring of the retaining and releasing device in an open position.

The segmented ring 2 can comprise three sectors 2', 2", 2'''configured to be separated in the released position of the retaining and releasing device, as shown in FIG. 9.

Figure 10:
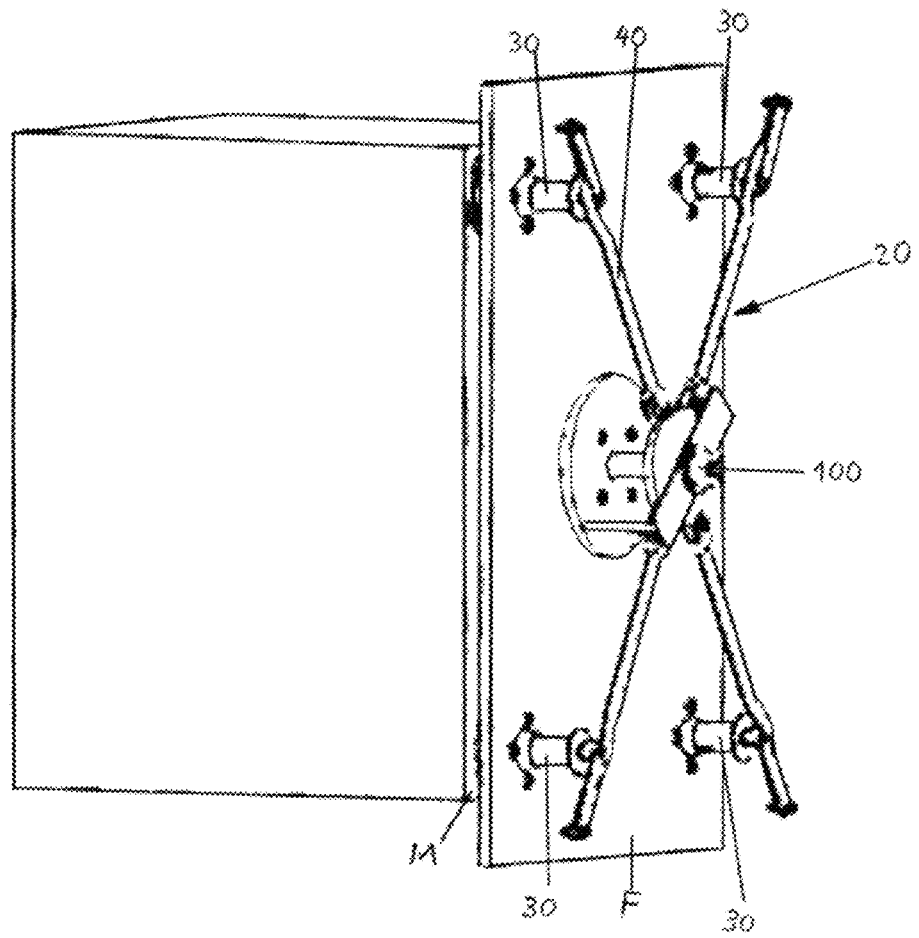
FIG. 10 shows a perspective view of a retaining and releasing assembly of the invention.

FIG. 10 shows a retaining and releasing assembly 20 for spacecraft of the invention with its components, that allows a release actuation by means of a central actuator 100 placed on the support structure F. The retaining and releasing assembly 20 also comprises several retaining and releasing devices 30 for spacecraft of any of the described embodiments, with a part on the releasable body M and a part on the support structure F (see FIGS. 11 to 12), and connected to the central actuator 100. The retaining and releasing devices 30 are configured to detach the releasable body M from the support structure F in the release position.

Figure 11:
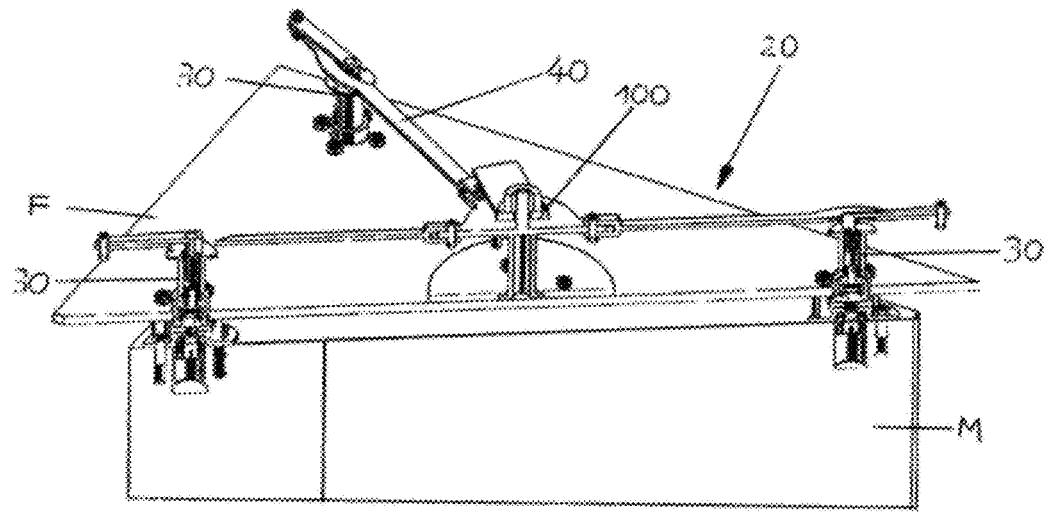
FIGS. 11-12 show several views of a retaining and releasing assembly for spacecraft of the invention in different positions.
Figure 12:
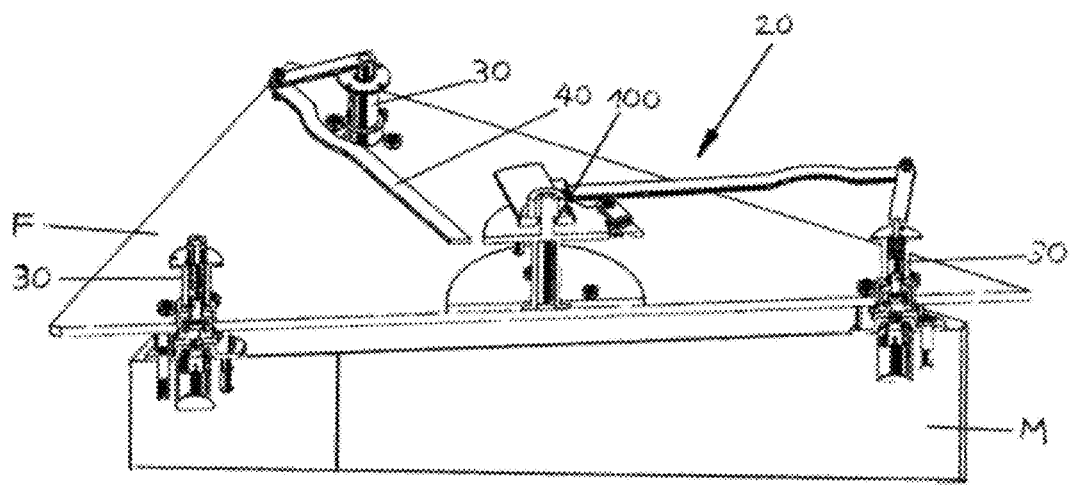

According to an embodiment, the retaining and releasing assembly 20 for spacecraft can have the central actuator 100 connected to the retaining and releasing devices 30 by means of a slider crank mechanism 40, as shown in FIGS. 10 to 12 in perspective view.

FIG. 11 shows a section of FIG. 10, with the retaining and releasing devices 30 in the retaining position. After the actuation of the central actuator 100 (FIGS. 11 and 12) the retaining and releasing devices 30 reach the release position and the releasable body M is released from the support structure F (FIG. 12).

Accordingly, the central actuator 100 allows simultaneous releases of all the retaining and releasing devices 30.

Although the present invention has been fully described in connection with preferred embodiments, it is evident that modifications may be introduced within the scope thereof, not considering this as limited by these embodiments, but by the contents of the following claims.

The invention claimed is:

1. A retaining and releasing device for spacecraft, configured for the retaining and releasing a releasable body with respect to a support structure, that comprises the retaining and releasing device comprising:
 a release bolt configured to keep the releasable body and the support structure together in a locked position of the retaining and releasing device,
 a locking device for locking the release bolt in the support structure, the locking device comprising a housing and a segmented ring, the housing being movable in a direction of an axis of the release bolt and the segmented ring configured to expand radially, an external surface of the segmented ring and an internal surface of a corresponding part of the housing being mating surfaces inclined with respect to the axis of the release bolt, such that in the locked position of the retaining and releasing device the release bolt is configured to be retained by the segmented ring,
 an extraction system for the release bolt, comprising a spring, an upper support, a lower support and a nut between the upper support and the lower support, the spring being guided by the upper support and the lower support, the release bolt being preloaded by action of the nut in the locked position of the retaining and releasing device,
wherein:
 the housing of the locking device comprises an end with a passing helical groove on a surface,
the retaining and releasing device additionally comprises:
 a release system for acting on the locking device, comprising:
  a rod-with a locking pin, the rod having a same orientation as the release bolt, and the locking pin configured to cooperate with the helical groove of the housing,
  a compression spring, and
  an actuator;
 the actuator is configured to lock the rod in a locked position of the retaining and releasing device, and the compression spring is arranged to abut the housing of the locking device and is arranged around the rod with the locking pin cooperating with the helical groove to turn the rod.

2. The retaining and releasing device for spacecraft, according to claim 1, wherein the locking device and the release system are arranged in the support structure.

3. The retaining and releasing device for spacecraft, according to claim 1, wherein the actuator is a permanent magnetic brake that surrounds the rod.

4. The retaining and releasing device for spacecraft, according to claim 1, wherein the mating surfaces of the segmented ring and the housing are tapered surfaces.

5. The retaining and releasing device for spacecraft, according to claim 1, wherein one end of the compression spring rests on a surface of a support opposite the surface of the housing that the compression spring is arranged to abut.

6. The retaining and releasing device for spacecraft, according to claim 1, further comprising an external housing that supports the actuator and surrounds the housing.

7. The retaining and releasing device for spacecraft, according to claim 1, wherein the segmented ring comprises three sectors configured to be separated in a released position of the retaining and releasing device.

8. A retaining and releasing assembly for spacecraft comprising a central actuator on the support structure surrounded by a plurality of retaining and releasing devices of claim 1 and connected by a slider crank mechanism to the release bolt for each of the retaining and releasing devices, having a part on the releasable body and a part on the support structure and connected to the central actuator.

* * * * *